Figure 1:
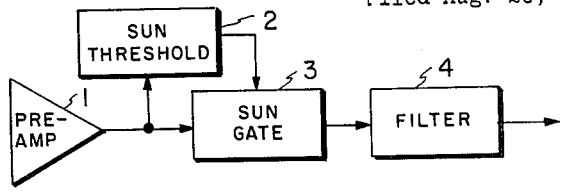

May 17, 1966 N. J. JOHNSON ET AL 3,251,996
PROCESSING CIRCUITS FOR INSTRUMENTS SUCH AS HORIZON SENSORS
Filed Aug. 20, 1962

INVENTORS
NORMAN J. JOHNSON
MURRAY L. POLK
BY
Robert James Horton
ATTORNEY

United States Patent Office
3,251,996
Patented May 17, 1966

3,251,996
PROCESSING CIRCUITS FOR INSTRUMENTS SUCH AS HORIZON SENSORS
Norman J. Johnson, Stamford, and Murray L. Polk, Norwalk, Conn., assignors to Barnes Engineering Company, Stamford, Conn., a corporation of Delaware
Filed Aug. 20, 1962, Ser. No. 218,002
8 Claims. (Cl. 250—83.3)

This invention relates to improved processing circuits for processing electrical signals in a predetermined range of amplitudes while ignoring signals of different, usually greater, amplitude.

A number of problems have arisen in the processing of electrical signals which normally are of a fixed or limited amplitude range but where much stronger signals are occasionally encountered which are spurious. The present invention is directed to the electronic circuits which produce the result of ignoring the stronger spurious signal but are not limited to the source of the signals. However, the most important single field at present for the present invention is the processing of signals from horizon sensors which scan the earth's horizon, usually conically, and which may encounter either the sun or the moon. Accordingly, the problem presented and the manner in which it is solved by the present invention will be discussed in connection with horizon sensors, it being understood, of course, that the circuits are not interested in the origin of the signals which they process and so are applicable to any signals where the problem stated above occurs.

In horizon sensors there has always been a problem when the scan strikes the sun or to a lesser extent when it scans across the moon. Since the horizon sensors operate by a measurement of the intervals between horizon crossings and a reference signal which is generated in the horizon sensor itself for a particular vehicle attitude the signals from the sun or the moon would be spurious and can produce a false sensor reading. When the sensor is used, as is frequently the case, to control a vehicle such as a rocket or a satellite the spurious signal can result in misguidance. Also, the signal from the sun is so powerful that it may adversely affect some of the processing circuits.

A typical horizon sensor which has achieved practical success is described in the Merlen Patent 3,020,407 of February 6, 1962. This horizon sensor is typical of the conical scanning type and describes scanning by means of rotation of a germanium prism which transmits the infrared radiation of the earth. In the Merlen sensor the two signals of different amplitudes which it is desired to process are described as the signals from the earth and from space which is close to absolute zero. These signals occur within a definite predetermined range and this is true of practically all horizon sensors. When the sun is perceived its powerful signal, which is far above the range of signals normally processed, actuates a sun presence circuit shown in block diagram form in FIG. 3 of the Merlen patent which sends out a gating signal that shuts off the output of the sensor until the vehicle to which it is attached has assumed an attitude in which the sun is no longer scanned. During the period when the sun is within the scan the sensor is not operating because its output is shut off and so for these periods there is a loss in signal information. In practice this has not been so serious as to prevent the utilization of the Merlen sensor which is the basis of most of the practical horizon sensors used today. However, it does present a situation of loss of signal for an appreciable time. It is one of the purposes of the present invention to improve the sun sensing circuitry so that the output of the normally scanned signal is not interrupted.

Essentially this problem is solved by the present invention by causing the sun signal or any other signal of greater amplitude to clamp the signal of the sensor to a predetermined low level. In the case of horizon sensors it is convenient and desirable to clamp to the level of space because, of course, the sun cannot be seen when the scan is moving across the earth. The sun is only seen for a very short portion of the scan and therefore its clamping of the preamplifier signal to the low level of space occurs only for that same short period of time during the space scan. As a result the output of the processing signals is exactly the same as if the sun were not there and there is never any time when there is a loss of system operation even for short numbers of scans. In other words the present invention performs all of the desirable and useful functions of the earlier sun presence circuits such as described in the Merlen patent, and in addition avoids any interruption of normal signals even for short periods of time.

There will be described in more detail below a simplified circuit which will eliminate very strong signals such as those from the sun. This simplified circuit operates only on relative amplitude of the signal. It may occur in horizon sensors or in other uses that a spurious signal may be produced which differs in wavelength or wavelength range from the desired signal. For example, in a horizon sensor the moon can interfere. This represents a signal which may be equal in amplitude to the normal signals but may not be sufficiently greater to actuate the sun elimination circuit as is the case with the sun. However, the hottest portion of the moon also shines by reflected sunlight and emits radiations predominantly in the visible and the near infrared regions and, therefore, there will also be described a more complex but also more perfect circuit which combines amplitude discrimination with wavelength discrimination. It is an advantage of the present invention that it is possible to design it with simple circuits using standard, readily available components. This is also true in the more complex circuit where wavelength discrimination is also present as the necessary optical elements are also well known, simple and reliable.

Figure 2:
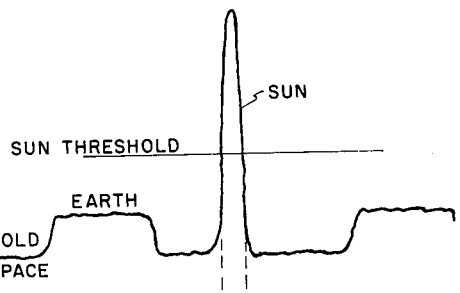
Figure 3:
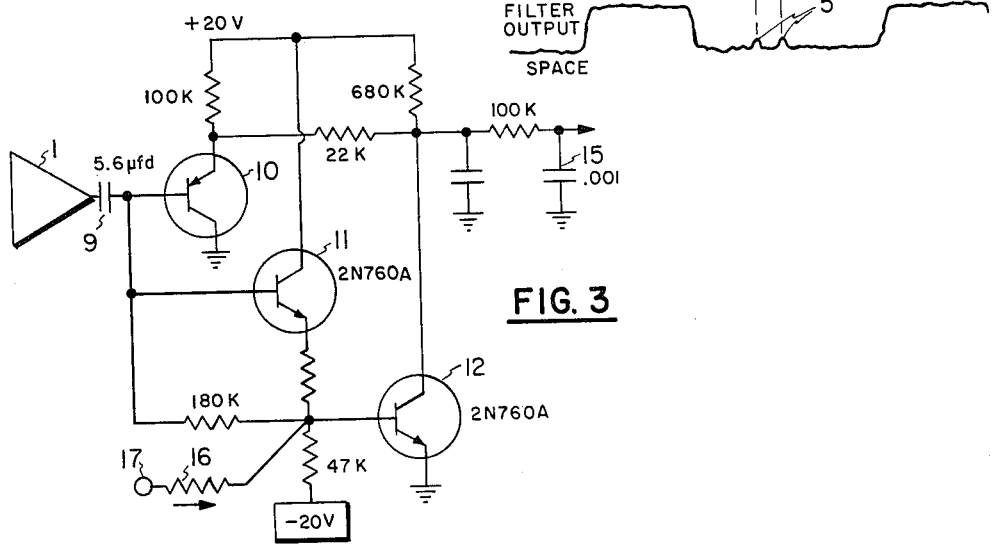
Figure 4:
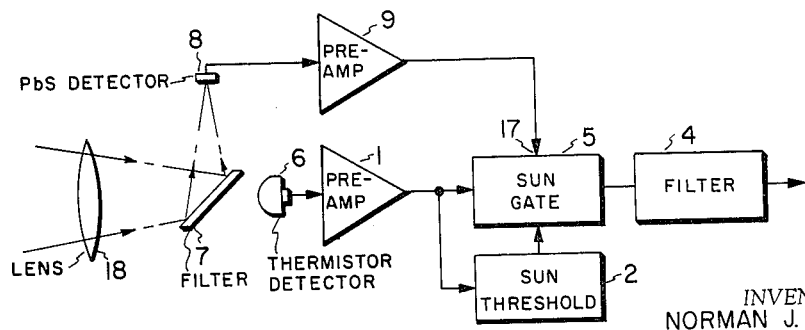

The invention wil be described in greater detail in conjunction with the drawings in which:

FIG. 1 is a block diagram of the circuit organization for a simplified modification;
FIG. 2 are a series of curves showing preamplifier output and filter output;
FIG. 3 is a schematic of a portion of FIG. 1, and
FIG. 4 is a block diagram of a modified set of circuits.

In FIG. 1 signals are received from a preamplifier 1, as for example signals from a horizon sensor. The output of the preamplifier is connected both to a sun threshold circui 2 and a sun gate circuit 3, the output of the latter being connected to a filter 4 and constitutes the final output signal as far as the present invention is concerned. In a horizon sensor, of course, this output is normally compared with a reference pulse at a given vehicle attitude and the resulting signal represents the amount and the direction by which the vehicle has departed from the predetermined attitude about the axis with respect to which the particular horizon sensor is giving information.

FIG. 2 is a series of curves. The first is a preamplifier output with a straight line indicating the threshold above which the present invention takes effect. The lower curve is the resulting output from the filter.

It will be seen that in the preamplifier output there is a minimum level as the sensor scans through space, which rises to a moderate level as the scan passes across the earth. A very large jump in level occurs as the scanning field intersects the sun. It will be seen that while very high in amplitude, the sun occupies only a small interval in the scanning space, the width of which has been exaggerated for clarity. After passing the sun the scan then drops back to the low figure for space until the next crossing of the earth's horizon takes place. The sun, of course, would represent a spurious signal and even if the limiting technique which is customarily utilized kept the amplitude of the sun from reaching the extreme heights shown it would still appear as an amplitude limited spurious pulse.

When the signal crosses the amplitude represented by the "sun threshold" line it actuates the sun threshold circuit 2 which actuates the sun gate 3 which brings the output down to that corresponding with space. The operation of the circuits do not, of course, eliminate the lower level portions of the signal, and so two very small spikes 5 appear in the final signal. These are caused by the non-instantaneous change in amplitude as the sun passes into and out of the field of view of the scanner. They are made very small by the filter 4 and are below the level at which the instrument registers.

The horizon sensor shown in FIGS. 1 and 2 or rather the processing circuits of which are shown, effectively ignores the presence of the sun and as far as the output signal is concerned the filter output is the same as if the sun had not been encountered in the scan. This is because the small spikes 5 are too low and contain too little energy to rise the above the output threshold of the instrument which responds to a level considerably above that of space to avoid spurious signals from the noise which is always present and which is shown as a ripple in the curves of FIG. 2.

FIG. 1 shows the energization of circuits of the simple modification. It is possible to design many circuits which will accomplish the desired results, that is to say to clamp the sun signal down to the space level. One typical circuit which has proven to be practically useful in actual instruments is illustrated in FIG. 3. It is, of course, typical and the invention is in no sense limited to its exact organization or to the components used.

The preamp 1 in FIG. 3 is the same as in FIG. 1 and as it is of conventional design its schematic is not shown. The output passes through a capacitor 9 which is connected to the base of a transistor 10. The emitter is connected to a source of positive potential as indicated through a fairly high resistor as shown and the collector is grounded. The transistor is, therefore, operating as an emitter follower. When the normal signal or rather signals within the normal range are received they pass on through the 22K resistor to the collector of a transistor 12 the emitter of which is grounded. With normal settings this transistor is cut off and therefore, the voltage passes on to filters which are composed of a resistor 13 with capacitors 14 and 15 on either side. The 680K resistor takes no part in the operation of the circuits under the present invention but is necessary for further processing circuits of certain types and so is included in the schematic which is that of an actual instrument. The filter 13 is essentially a low pass filter which bypasses high frequency fluctuations and thus reduces noise. It is also very useful in reducing the amplitude of the spikes 5 which are encountered when the sun is first scanned. The filter does not eliminate these spikes completely but it reduces them to so low a level that they are below the threshold of the instrument's output response.

Let it be assumed now that the horizon sensor scans across the sun. The signal coming out of the preamp 1 is now enormously increased and it is applied not only to the base of the transistor 10 but also to the base of a transistor 11 which is likewise connected as an emitter follower but in the reverse polarity. Ordinarily the emitter of transistor 11 follows the voltage on the base of the transistor 10 except for the small drop between base and emitter of the transistor 11. The very strong sun signal, however, greatly increases the conduction through the transistor 11 and raises the emitter potential to a fairly high positive value. This emitter is connected through a voltage divided to a minus 20 volt supply and the characteristics of the voltage divider are such that normally the junction of the two resistors is negative but when a strong signal from the sun comes in this point reaches a positive value. As the base of transistor 12 is connected to the junction of the resistors it also becomes positive and transistor 12 switches to full conduction thus clamping the signal output at capacitor 14 to that corresponding to space which is shown in FIG. 2.

As soon as the sun passes, the voltage on the emitter 11 drops to a value slightly below that on the base of transistor 10. The junction of the two resistors in the emitter circuit therefore becomes negative and transistor 12 is once more cut off. The normal signal then passes through as described above. It will be noted that the junction of the two emitter resistors is also connected through a resistor 16 to a point 17. In the operation of the circuits when arranged according to FIG. 1 this connection is omitted but it is necessary in connection with the more elaborate instruments shown in FIG. 4 and it is therefore illustrated in the schematic because otherwise the schematic of FIG. 3 is just the same regardless of which modification is being used.

FIG. 4 shows radiation coming in and imaged by a lens 18 onto an infrared detector 6 the output of which is connected to the preamp 1. However, the beam passes through a filter 7 which is in the form of a dichroic mirror and which does not pass readily the intense radiations of the sun in the visible and near infrared region. These shorter wavelength radiations are reflected and strike a lead sulfide detector 8 or other suitable detector which is sensitive to the visible and very short wave infrared. The output of this detector is amplified in the preampifier 9 and is connected to the point 17 of FIG. 3. The value of the resistor 16 depends on the circuit values of preamplifier 9 and on the type of detector 8 and so is not specified on FIG. 3.

During normal operation of the horizon sensor the signals from space and earth do not actuate the detector 8 because there is substantially no energy in the shorter wavelengths to which this detector responds and which are preferentially reflected by the dichroic filter 7. Accordingly there is no signal from the detector 8, no output signal from preamp 9 and the circuit in FIG. 3 operates just as is described for normal operation above. The longer wave infrared radiation from the earth, however, passes readily through the filter 7 and is detected by the detector 6. The filter, therefore, does not interfere with the operation of this detector for ordinary horizon sensor signals.

If now the scan crosses the sun there will be a strong radiation in the near infrared and visible. The detector 8 will detect this radiation and preamplifier 9 will amplify the output signal. This is applied directly through resistor 16 to the base of the transistor 12 and causes the latter to go into conduction clamping the output signal from the filter 13 to space as is described in conjunction with the operation of FIG. 3. At the same time the detector 16 also receives a strong signal in the longer wave infrared, the intensity of the sun source is so enormous that it still passes a signal well above the sun threshold value, illustrated in FIG. 2. In other words, the output from detector 6 amplified by preamp 1 also tends to cause sufficient conduction in the transistor 11 so that the junction point of the emitter resistors thereof would be positive in any event.

The provision of the additional detector performs two useful functions. First, it provides for a redundancy of the sun response because even if the detector 8 should malfunction the detector 6 would still clamp the signal to space when the sun comes into the scan. The second function performed is in certain respects even more important because it will act as a moon gate as well as a sun gate. If the moon is scanned with the simple circuits of FIGS. 1 to 3 the intensity of the signal from the illuminated portion of the moon may not be sufficiently high so that it passes the sun threshold value. However, the moon's radiation from its hot side is very rich in the visible and in the very short wavelength infrared due to sunlight. Therefore, it is readily reflected by the filter 7 and is detected by the detector 8 which is responsive to radiations in this wavelength range. Accordingly, there is a prompt and reliable operation of the circuits if the moon is scanned just as much as if the sun is scanned and this is an important additional advantage of the modification of FIG. 4.

There is also another advantage in FIG. 4 which, however, in many cases, is less vital. The filter 7 greatly attenuates the intensity of the sun's radiation in the longer wave infrared and so makes overloading of the detector 6 and/or the preamp 1 impossible. This additional desirable, though not so essential, function is performed without adding any additional elements and constitutes another advantage of the modification shown in FIG. 4.

It will be apparent that in FIG. 3 the transistor 11 could be eliminated by a suitable connection of the transistor 12 to the emitter of the transistor 10 or even to the base of transistor 10. However, transistor 11 performs the valuable function of a power amplifier so that the input circuit of transistor 10 is not overloaded and the sensitivity of response of transistor 11 can be more precisely determined, in other words the determination of the sun threshold can be made with greater precision. Of course, the present invention includes such a simplified circuit which performs the same function but inasmuch as the additional elements are cheap it will often be preferable to use the full circuit shown in FIG. 3.

The present invention has been described in connection with circuits which clamp the output signal down to that of space when the sun or other unwanted signal is encountered. It will be obvious that it is not necessary that the clamping be to this exact voltage level. It can be to any desired level provided, of course, that it is lower than the range of signals for normal response.

In the description of the present invention the spurious signal has been one of greater intensity than any normally encountered and/or produced by a shorter wavelength radiation in the case of horizon sensors. This will almost invariable be the case with horizon sensors but in the case of some other instruments it may be necessary to discriminate against an unwanted signal of amplitude below a certain level or of a signal produced by radiation of a longer wavelength than that which is normally being processed. While such instruments are relatively rare the present invention operates perfectly with them by suitable adjustment of the characteristics of the transistor 11 in FIG. 3 so that it responds to signals below a certain level instead of above. Similarly, in the case of the reverse frequency discrimination in FIG. 4 a short wavelength pass filter would have to be placed at 7 or detectors 6 and 8 interchanged.

The immediately preceding paragraphs have shown that the present invention can be applied to quite a wide range of problems and, of course, it should also be realized that the circuits need not be of the type shown, for example vacuum tube circuits may be used or any other circuits which have the proper response characteristics. However, for reliability, low power consumption and low weight solid state components such as transistors present many advantages and are therefore preferred.

We claim:
1. Processing circuits for the elimination of relatively short duration, spurious signals which differ from the signals normally processed by amplitudes falling outside the range of amplitudes of normal signals, said circuits comprising,
   (a) signal source processing circuits producing an output signal from input signals of a predetermined amplitude range, of comparatively long duration
   (b) electronic means for clamping the output of the processing circuits to a predetermined voltage level, and
   (c) said clamping means being actuated by electronic means responsive to comparatively short signals of an amplitude differing from the range of amplitudes of normal signals by a predetermined amount.

2. Circuits according to claim 1 in which the clamping means comprises a switching transistor.

3. Circuits according to claim 2 in which the clamping transistor is in the output circuit of another transistor the input to which is connected to the signals to be processed.

4. Circuits according to claim 1 in which the signals are produced by radiations, the spurious signal radiating predominantly in a frequency range differing from that of the signals normally to be processed, comprising,
   (a) multiple radiation detectors, one responsive to radiations in the frequency range of the signals to be processed and connected to the processing circuit input and another receiving and responsive to radiations in the frequency range of the signal to be discriminated against said second detector being substantially unresponsive to signals of the frequency to be processed,
   (b) the output of said second detector being connected to actuate the electronic means to clamp output signal to a predetermined voltage level.

5. Circuits according to claim 4 in which the clamping means comprises a switching transistor and the output of the detector responsive to radiations of a frequency of the signal to be discriminated against is applied to the base of said transistor.

6. Processing circuits according to claim 4 in which the clamping means is also responsive to signals from the detector which is responsive to frequencies of the signals normally to be processed whenever these signals have an amplitude departing by a predetermined amount from the range of amplitudes of the signals normally to be processed.

7. Circuits according to claim 1 in which there is provided an output filter of the low pass type.

8. Circuits according to claim 4 in which there is provided an output filter of the low pass type.

References Cited by the Examiner
UNITED STATES PATENTS

| | | | |
|---|---|---|---|
| 2,927,212 | 3/1960 | Shimukonis et al. | 250—83.3 |
| 3,031,576 | 4/1962 | Loy | 250—83.3 |
| 3,065,347 | 11/1962 | Bossart | 250—83.3 |

RALPH G. NILSON, *Primary Examiner.*

A. R. BORCHELT, *Examiner.*